United States Patent Office 3,251,828
Patented May 17, 1966

3,251,828
POLYPHOSPHORIC ACID ESTERS OF POLYETHER POLYOLS
Martin R. Lutz, Basel, Switzerland, assignor to FMC Corporation, New York, N.Y., a corporation of Delaware
No Drawing. Filed Oct. 23, 1962, Ser. No. 232,594
6 Claims. (Cl. 260—234)

This invention relates to polyether polyols and more particularly, to novel phosphorus-containing polyether polyols and flame-retardant polyurethane compositions derived therefrom.

There has been much investigation in recent years of flame-retardant polyurethane compositions which can be used as foams, coatings and castings for applications in which heat or fire is a hazard. It has been suggested, for example, that some degree of flame resistance can be achieved by incorporating a flame retarding additive into the formulation. However, liquid flame retardants are either incompatible or have a plasticizing action which degrades the properties of the composition. Moreover, liquid additives tend to be lost over a period of time through bleeding and volatilization, thus resulting in a decreasing degree of flame-retardance as the composition ages. On the other hand, solid flame-retardants tend to embrittle the polyurethane composition. Moreover, none of these additives has been completely satisfactory in imparting a high degree of flame-retardance to the polyurethane compositions.

It is an object of this invention to provide flame-retardant polyurethane compositions containing no flame retarding additive.

Another object is to provide novel phosphorus-containing polyether polyols which can be used as intermediates in the preparation of flame-retardant polyurethane compositions.

These and other objects will become apparent from the following description of this invention.

The novel phosphorus-containing polyether polyols of this invention which may be used in the preparation of flame-retardant polyurethane compositions are the reaction products of (a) the product formed by the esterification of (1) polyphosphoric acid containing 3–13% $P_2O_5$ in excess of the amount which provides 100% $H_3PO_4$ with (2) a polyol selected from the group consisting of polyhydroxyalkanes containing 3–6 hydroxyl groups, carbohydrates containing 5–8 hydroxyl groups and mixtures thereof, said polyol moiety being present in the amount of 2–4 moles for each mole of $P_2O_5$ in excess of the amount which provides 100% $H_3PO_4$, and (b) an alkylene oxide containing 2–4 carbon atoms, said alkylene oxide moiety being present in an amount sufficient to neutralize all phosphoric acid groups but less than the amount which lowers the hydroxyl number of the reaction product below 200.

The novel polyols of this invention are prepared by first esterifying a polyhydroxyalkane containing 3–6 hydroxyl groups or a carbohydrate containing 5–8 hydroxyl groups with polyphosphoric acid. This esterification product is then reacted with an alkylene oxide containing 2–4 carbon atoms.

Polyphosphoric acid is prepared by adding $P_2O_5$ to $H_3PO_4$. When aqueous $H_3PO_4$ is employed, $P_2O_5$ must be added in excess of the amount necessary to make 100% $H_3PO_4$, which has a $P_2O_5$ content of about 72%. The polyphosphoric acids which are useful in this invention are those having $P_2O_5$ contents of about 75–85% or about 3–13% in excess of the amount which provides 100% $H_3PO_4$. Preferably, the polyphosphoric acid has a $P_2O_5$ content of 80–82%. When the polyphosphoric acid has a $P_2O_5$ content less than about 75% there is insufficient excess $P_2O_5$ to economically carry out the esterification reaction. Polyphosphoric acid having a $P_2O_5$ content in excess of about 85% is too viscous to be useful in the process.

The polyphosphoric acid is esterified by reaction with a liquid polyol. This polyol may be a polyhydroxyalkane containing 3–6 hydroxyl groups such as glycerol, trimethylolethane, trimethylolpropane, 1,2,6-hexanetriol, pentaerythritol or sorbitol. The polyol may also be a carbohydrate containing 5–8 hydroxyl groups such as sucrose or dextrose.

The esterification of the polyol with polyphosphoric acid is carried out by reacting about 2–4, and preferably about 3 moles of polyol with each mole of $P_2O_5$ in excess of the amount which provides 100% $H_3PO_4$. If you consider polyphosphoric acid to be a mixture of $H_3PO_4$ and excess $P_2O_5$ over 100% $H_3PO_4$, then each mole of excess $P_2O_5$ reacts with 3 moles of polyol, represented as RpOH, in accordance with the equation:

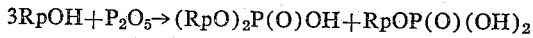

Then the $(RpO)_2P(O)OH$ reacts with the $H_3PO_4$ content of polyphosphoric acid as follows:

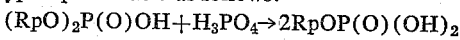

The overall reaction is:

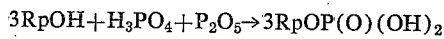

Since polyphosphoric acid having a $P_2O_5$ content of 75–85% contains more $H_3PO_4$ than excess $P_2O_5$, there will be excess $H_3PO_4$ left over after the reaction is completed. This reaction may be carried out in the presence of a solvent such as dioxane or in the absence of any solvent.

Of course, it must be recognized that the above equations and formulas are an oversimplification of the reactions actually taking place and the products actually formed. The choice of which hydroxyl group of the polyol will enter into the reaction, whether every polyol molecule will enter into the reaction or whether more than one hydroxyl group on any particular molecule will react is a matter of statistical chance.

The product formed by the above esterification is then neutralized by reaction with an alkylene oxide containing 2–4 carbon atoms. Examples of suitable alkylene oxides include ethylene oxide, propylene oxide, epichlorohydrin and butene oxide. Based upon cost, availability and hydrophobic properties of the final product, propylene oxide is preferred.

Reaction of the esterification product with alkylene oxide serves two purposes. First it neutralizes all phosphoric acid groups contained in the ester

as well as the phosphoric acid groups remaining in the excess $H_3PO_4$ at the end of the esterification reaction. The reaction between an alkylene oxide, such as propylene oxide, and $H_3PO_4$ forms a tris(hydroxypropyl) phosphate having the formula $O=P[O(C_3H_6O)_nH]_3$ where $n$ is preferably about 1–3. The second purpose of the alkylene oxide is to react with the original hydroxyl groups of the polyol thereby increasing the molecular weight of the final product. However, the molecular weight should not be increased to the point that the hydroxyl number of the final product is below about 200, since satisfactory rigid polyurethane foams cannot be obtained from such products. Thus, sufficient alkylene oxide must be employed to at least neutralize all phosphoric acid groups; but less than the amount which lowers the hydroxyl number of the reaction product below about 200 should be employed. Preferably the hydroxyl number should not be below about 300.

The flame-retardant polyurethane compositions derived from the novel phosphorus-containing polyether polyols disclosed herein are prepared by condensing about one hydroxyl equivalent weight of the polyol with at least about one isocyanate equivalent weight of an aromatic polyisocyanate; one hydroxyl group being equivalent to one isocyanate group. In practice, a slight excess of polyisocyanate, for example about 5%, is generally added to insure complete reaction.

The aromatic polyisocyanate may be any of those conventionally used in the preparation of polyurethanes. Examples of these polyisocyanates include aromatic diisocyanates such as 2,4-tolylene diisocyanate, 2,6-tolylene diisocyanate, o-phenylene diisocyanate, m-phenylene diisocyanate, p-phenylene diisocyanate, 3,3'-bitolylene-4,4'-diisocyanate, methylene-p-diphenyl diisocyanate, methylene-4,4'-bis(2-methylphenyl)diisocyanate, 1,5-naphthalene diisocyanate, 3,3'-dimethyl-4,4'-biphenylene diisocyanate, 3,3'-dimethoxy-4,4'-biphenylene diisocyanate, and 2,2'-5,5'-tetramethyl-4,4'-biphenylene diisocyanate, higher aromatic polyisocyanates such as methylidynetriphenyl triisocyanate and tolylene-2,4,6-triisocyanate, and mixtures of any of the above aromatic polyisocyanates.

A further and preferred class of polyisocyanates for the preparation of flame-retardant polyurethane compositions includes chlorinated aromatic diisocyanates which contain at least about 25% by weight chlorine. Suitable aromatic diisocyanates which are readily chlorinated include m-phenylene diisocyanate, p-phenylene diisocyanate, 2,4-tolylene diisocyanate, 2,6-tolylene diisocyanate, 3,3'-dimethyl-4,4'-biphenylene diisocyanate and methylene-p-diphenyl diisocyanate. A particularly preferred class of chlorinated aromatic diisocyanates are chlorinated m-phenylene diisocyanates.

Chlorinated m-phenylene diisocyanates can be prepared by chlorinating m-phenylene diisocyanate using a ferric chloride catalyst at elevated temperatures. A suitable process for chlorinating m-phenylene diisocyanate is taught by J. J. Tazuma in Patent Nos. 2,915,545 and 2,945,875. The chlorination reaction proceeds stepwise and thus can be terminated so as to form a product containing predominantly any desired degree of chlorination, that is, monochloro-, dichloro-, trichloro-, or tetrachloro-m-phenylene diisocyanate.

Chlorinated m-phenylene diisocyanates are normally solid and must be warmed to form a liquid which can be blended with the polyol component used in accordance with this invention. Although this blending can be accomplished with normally solid diisocyanate in this manner, it is much simpler to use liquid blends of chlorinated m-phenylene diisocyanates.

Chlorinated m-phenylene diisocyanate which is liquid at about room temperature can be prepared by blending chlorinated m-phenylene diisocyanate fractions which are chlorinated to different degrees. For example liquid mixtures containing 25–45%, by weight chlorine, are prepared by blending various amounts of dichloro-, trichloro-, and tetrachloro-m-phenylene diisocyanate fractions. The liquid blend containing equal amounts of these three fractions has a chlorine content of about 39% by weight. The liquidity of chlorinated m-phenylene diisocyanate blends can be further improved by the addition of a fourth component such as unchlorinated m-phenylene diisocyanate, monochloro-m-phenylene diisocyanate, or another aromatic diisocyanate such as tolylene diisocyanate. These chlorinated phenylene diisocyanate liquid blends are fully disclosed by Erickson and Warren in co-pending application Serial No. 202,100 filed June 13, 1962.

High exothermic heats of reaction may be avoided in the preparation of polyurethane compositions by forming a polyol-diisocyanate quasi-prepolymer containing residual isocyanate groups. This prepolymer is formed by reacting 1 equivalent of diisocyanate with less than 1, for example about 0.25 equivalent weight of polyol component. The polyurethane composition is then prepared by reacting the quasi-prepolymer with sufficient additional polyol component to provide the desired ratio of about 1 hydroxyl equivalent weight for each isocyanate equivalent weight.

Polyurethane compositions may be prepared using one or more phosphorus-containing polyols and one or more aromatic polyisocyanates. For example, the high molecular weight polyol component may be a blend of two or more different phosphorus-containing polyols, or one or more conventional high molecular weight polyols may be blended with one or more phosphorus-containing polyols. Similarly, two or more aromatic diisocyanates may be blended together.

Although the degree of flame-retardance of a polyurethane composition cannot always be accurately predicted from a knowledge of the phophorus and halogen content, in most cases the flame-retardance will vary in proportion to the phophorus and halogen content. When the phosphorus-containing polyether polyols of this invention are reacted with chlorinated m-phenylene diisocyanate, it has been found that changes in phophorus content have a greater effect upon flame-retardance than do changes in halogen content. As a general rule, polyurethane compositions containing 1.75% phosphorus will be non-burning at a halogen content of about 22%. As the phosphorus content rises to 2.25% the halogen content requirement drops to about 17%, while at 3% phosphorus only 9% halogen is required for non-burning polyurethane compositions.

Although the burning characteristics of polyurethanes depend primarily on their composition, these characteristics are also affected by the physical form of the polyurethane composition, such as foam, coating, casting, etc. In the case of foams, the burning characteristics are modified by such parameters as density, cell structure, and the composition of the gas within the cells.

The polyurethane compositions taught herein have useful applications as flame-retardant foams, surface coatings, castings and moldings. They are especially useful as rigid foams which can be used as flame-proof insulation materials for the building industry.

Foams are readily prepared by mixing together the polyol component, the aromatic polyisocyanate and a blowing agent, such as a fluorinated hydrocarbon or water. As the reaction between the polyol and the polyisocyanate begins, the exothermic heat of reaction vaporizes the fluorinated hydrocarbon with a resulting expansion of the reaction medium into a foam. When water is used as the blowing agent, it reacts with the polyisocyanate liberating carbon dioxide which expands the reaction medium. Small amounts of additional components such as catalysts and emulsifiers may be added, if desired, to alter the handling characteristics of the reaction mixture or the properties of the foam.

In the illustrative examples which follow, the flame-retardance of the polyurethane foams was measured in accordance with ASTM test method D1692–59T. Samples of the foam measuring 2 x 6 x ½ in. were marked by drawing lines 1 in. and 5 in. from one end of each sample. Thus, each sample was divided into three sections measuring 1 in., 4 in. and 1 in. A wing-tipped Bunsen burner flame was applied to one end of the sample until the burning reached the 1 in. line, or for a period of 1 min., whichever was shorter. If the 1-in. line was not reached by the burning, the sample was considered to be non-burning. Of the sample burned beyond the 1-in. line and then went out before reaching the 5-in. line, it was rated as self-extinguishing and the amount of burning beyond the 1 in. line was noted.

The following examples, illustrating the novel phosphorus-containing polyether polyols disclosed herein and the novel flame-retardant polyurethane compositions derived therefrom, are presented without any intention that the invention be limited thereto. All parts and percentages are by weight.

*Example 1*

A phosphorus-containing polyether polyol was prepared as follows: Ten parts of sucrose and 10 parts of glycerol were stirred together and heated to 125–135° C. for 1.5 hrs. until a clear solution was obtained. The solution was cooled to 90° C., 150 parts of dioxane and 29.5 parts of polyphosphoric acid containing 80% $P_2O_5$ were added and the mixture was stirred for 0.5 hr. at 40–50° C. after which 100 parts of propylene oxide was added over a 1 hr. period. Stirring was continued for another 8 hrs. after which the solvent was stripped off at 60° C. and 0.5 mm. Hg and the product was filtered. The yield was 115 parts (80% of theoretical) of a phosphorus-containing polyether polyol product containing 7.2% phosphorus and 4.0 hydroxyl groups per phosphorus atom and having a hydroxyl number of 460 and an acid number of 4.8.

A polyurethane foam was prepared as follows: Six equivalents of a liquid blend of chlorinated m-phenylene diisocyanate having a chlorine content of 39% and obtained by blending equal amounts of tetrachloro-, trichloro- and dichloro-m-phenylene diisocyanate was heated and then blended with 1 equivalent of a commercially available polyether polyol having a hydroxyl number of 635 and derived from the condensation of propylene oxide with sorbitol. To 10 parts of this quasi-prepolymer was added a mixture consisting of 0.3 part of the above conventional polyether polyol, 6.25 parts of the phosphorus-containing polyether polyol prepared above, 3.25 parts of trichlorofluoromethane blowing agent, 0.25 part of an organosilicone copolymer emulsifier sold as L–520 by Union Carbide Corp., 0.1 part of dibutyltin dilaurate, and 0.1 part of N-methylmorpholine. This mixture was stirred at a high rate for 17 sec., after which foaming took place. The resulting foam was rigid, had fine cells, a density of 2.2 lbs./cu. ft. and was self-extinguishing.

*Example 2*

A phosphorus-containing polyether polyol was prepared as follows: A blend of 34.4 parts of polyphosphoric acid containing 80% $P_2O_5$ and 36.4 parts of sorbitol was stirred in 100 parts of dioxane at 55–65° C. for 4 hrs. until all the sorbitol had reacted. To this blend was added 130 parts of propylene oxide at a temperature of 40–50° C. over a 0.5 hr. period. Stirring at this temperature was continued for another 8 hrs. after which the solvent was stripped off at 60° C. and 0.5 mm. Hg. The yield was 181.3 parts (90% of theoretical) of a phosphorus-containing polyether polyol containing 6.4% phosphorus and 5.1 hydroxyl groups per molecule and having a hydroxyl number of 567 and an acid number of 8.8.

A polyurethane foam was prepared as follows: Nine parts of a liquid blend of chlorinated m-phenylene diisocyanate having a chlorine content of 39% was heated and then blended with 1 part of a commercially available polyether polyol having a hydroxyl number of 635 and derived from the condensation of propylene oxide with sorbitol. To 10 parts of this quasi-prepolymer was added a mixture of 5.38 parts of the phosphorus-containing polyether polyol prepared above, 0.1 part of dibutyltin dilaurate, 0.1 part of N-methylmorpholine, 0.25 part of an organo-silicone copolymer emulsifier and 3.25 parts of trichlorofluoromethane blowing agent. This mixture was stirred at a high rate for 16 sec., after which foaming took place. The resulting foam was rigid, had fine cells, a density of 2.46 lbs. per cu. ft. and was non-burning.

*Example 3*

A phosphorus-containing polyether polyol was prepared as follows: Twelve and four-tenths parts of glycerol and 16.4 parts of sorbitol were stirred and heated to 125–135° C. for 1.5 hrs. until a clear solution was obtained. The solution was cooled to 90° C., 15 parts of a previously prepared phosphorus-containing polyether polyol was added as solvent along with 37.5 parts of polyphosphoric acid containing 80% $P_2O_5$. The mixture was stirred for 0.5 hr. at 40–50° C. after which 184.8 parts of propylene oxide was added over a 1-hr. period. Stirring was continued for another 8 hrs., after which the product was filtered. The yield was 258 parts (96% of theoretical) of a phosphorus-containing polyether polyol product containing 4.9% phosphorus and 4.2 hydroxyl groups per phosphorus atom and having a hydroxyl number of 356 and an acid number of 8.1.

Polyurethane foam was prepared as follows: Eighteen parts of a liquid blend of chlorinated m-phenylene diisocyanate having a chlorine content of 39% was heated and then blended with 2 parts of a commercially available polyether polyol having a hydroxyl number of 635 and derived from the condensation of propylene oxide with sorbitol. To 20 parts of this quasi-prepolymer was added a mixture consisting of 16.2 parts of the phosphorus-containing polyether polyol prepared above, 0.09 part of stannous octoate, 0.06 part of triethylamine, 0.16 part of an organo-silicone copolymer emulsifier and 6.0 parts of trichlorofluoromethane blowing agent. This mixture was stirred at a high rate for 23 seconds, after which foaming took place. The resulting foam was rigid, had fine cells, a density of 2.3 lbs. per cubic foot and was non-burning.

*Example 4*

A phosphorus-containing polyether polyol was prepared as follows: Nine and seven-tenths parts of glycerol was stirred with 22.3 parts of polyphosphoric acid containing 78.5% $P_2O_5$ for 0.5 hr. at 40–50° C., after which 96 parts of propylene oxide was added over a 1-hr. period. Stirring was continued for another 8 hrs. and the product was filtered. The yield was 124.8 parts (97% of theoretical) of a phosphorus-containing polyether polyol product containing 5.9% phosphorus and 3.4 hydroxyl groups per phosphorus atom and having a hydroxyl number of 427 and an acid number of 5.8.

A polyurethane foam was prepared as follows: Eighteen parts of a liquid blend of chlorinated m-phenylene diisocyanate having a chlorine content of 39% was heated and then blended with 2 parts of a commercially available polyether polyol having a hydroxyl number of 635 and derived from the condensation of propylene oxide with sorbitol. To 20 parts of this quasi-prepolymer was added a mixture consisting of 13.5 parts of the phosphorus-containing polyether polyol prepared above, 0.09 part of stannous octoate, 0.06 part of triethylamine, 0.16 part of an organo-silicone copolymer emulsifier and 6.0 parts of trichlorofluoromethane. This mixture was stirred at a high rate for 24 seconds, after which foaming took place. The resulting foam was rigid, had fine cells, a density of 2.2 lbs. per cu. ft. and was non-burning.

As will be apparent to those skilled in the art, numerous modifications and variations of the phosphorus-containing polyether polyols illustrated above may be made without departing from the spirit of the invention or the scope of the following claims.

I claim:

1. A phosphorus-containing polyether polyol reaction product of
   (a) the product formed by the esterification of
      (1) polyphosphoric acid containing 3–13% $P_2O_5$ in excess of the amount which provides 100% $H_3PO_4$ with
      (2) a polyol selected from the group consisting of polyhydroxyalkanes of 3–6 hydroxyl groups and 3–6 carbon atoms, carbohydrates of 5–8 hydroxyl groups and 6–12 carbon atoms, and mixtures thereof,
   said polyol moiety being present in the amount of 2–4 moles for each mole of $P_2O_5$ in excess of the amount which provides 100% $H_3PO_4$, and
   (b) an alkylene oxide selected from the group consisting of ethylene oxide, propylene oxide, epichlorohydrin, and butene oxide being present in an amount sufficient to neutralize all phosphoric acid groups, but less than the amount which lowers the hydroxyl number of the reaction product below 200.

2. A phosphorus-containing polyether polyol reaction product of
   (a) the product formed by the esterification of
       (1) polyphosphoric acid containing 8-10% $P_2O_5$ in excess of the amount which provides 100% $H_3PO_4$ with
       (2) a polyol selected from the group consisting of polyhydroxyalkanes of 3-6 hydroxyl groups and 3-6 carbon atoms, carbohydrates of 5-8 hydroxyl groups and 6-12 carbon atoms, and mixtures thereof,
   said polyol moiety being present in the amount of 3 moles for each mole of $P_2O_5$ in excess of the amount which provides 100% $H_3PO_4$, and
   (b) propylene oxide in an amount sufficient to neutralize all phosphoric acid groups, but less than the amount which lowers the hydroxyl number of the reaction product below 300.

3. A phosphorus-containing polyether polyol of claim 2 in which the polyol is a mixture of sucrose and glycerol.

4. A phosphorus-containing polyether polyol of claim 2 in which the polyol is glycerol.

5. A phosphorus-containing polyether polyol of claim 2 in which the polyol is sorbitol.

6. A phosphorus-containing polyether polyol of claim 2 in which the polyol is a mixture of glycerol and sorbitol.

References Cited by the Examiner

UNITED STATES PATENTS 3,134,742   5/1964   Wismer et al. _____ 260—461 X

FOREIGN PATENTS 452,508   1/1955   Great Britain.

CHARLES B. PARKER, *Primary Examiner.*

IRVING MARCUS, *Examiner.*